(12) United States Patent
Hur-Diaz et al.

(10) Patent No.: US 6,266,584 B1
(45) Date of Patent: Jul. 24, 2001

(54) ROBUST AUTONOMOUS GPS TIME REFERENCE FOR SPACE APPLICATION

(75) Inventors: Sun Hur-Diaz, Austin, TX (US); Jack Rodden, Los Altos; Richard A. Fuller, Los Gatos, both of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/256,712

(22) Filed: Feb. 24, 1999

Related U.S. Application Data

(60) Provisional application No. 60/080,213, filed on Mar. 31, 1998.

(51) Int. Cl.[7] ................................ G06F 7/00; G05D 3/00
(52) U.S. Cl. ...................... 701/13; 701/213; 701/226; 701/214; 244/158 R; 244/164; 342/357.02; 342/357.06
(58) Field of Search ................ 701/13, 3, 4, 213, 701/214, 221, 222, 224, 225, 226, 215; 244/164, 165, 158 R; 342/352, 354, 357.04, 357.11, 358, 356, 463, 442, 357.12, 62, 357.02, 357.01, 357.06; 380/274, 258

(56) References Cited

U.S. PATENT DOCUMENTS

| | | | |
|---|---|---|---|
| 5,109,346 | * 4/1992 | Wertz | 701/226 |
| 5,347,286 | * 9/1994 | Babitch | 342/359 |
| 5,430,657 | * 7/1995 | Kyrtsos | 701/226 |
| 5,490,076 | 2/1996 | Rawicz et al. | 701/214 |
| 5,506,781 | 4/1996 | Cummiskey et al. | 701/226 |
| 5,528,502 | * 6/1996 | Wertz | 701/226 |
| 5,535,278 | 7/1996 | Cahn et al. | 380/274 |
| 5,657,025 | * 8/1997 | Ebner et al. | 701/219 |
| 5,781,151 | * 7/1998 | Stratton | 342/357.11 |
| 5,825,326 | * 10/1998 | Semler et al. | 342/357.04 |
| 5,862,495 | * 1/1999 | Small et al. | 701/13 |

* cited by examiner

*Primary Examiner*—Jacques H. Louis-Jacques
(74) *Attorney, Agent, or Firm*—Perman & Green, LLP

(57) ABSTRACT

A receiver clock bias signal for a spacecraft in motion is is used to obtain a real-time navigation Kalman filter solution of the clock bias and provide a robust autonomous GPS time reference, even when there are less than 4 GPS satellites within the view of the receiver in the spacecraft. The Kalman filter of the spacecraft provides an accurate solution of the clock bias, with less than 4 GPS satellite signals, by means of a system which uses the knowledge of the dynamic motion of the satellite in conjunction with GPS signals for a robust estimation of time. The system provides an accurate GPS time reference by transferring timing information from an atomic reference standard (GPS) to a spacecraft in motion by directly measuring the GPS signal and without depending upon the tracking of multiple GPS satellites or a static receiver. Implementation in current aerospace qualified GPS receivers, e.g., the "GPS TENSOR™", and known orbital dynamics are used to predict receiver position which aids in the transfer of the GPS time.

8 Claims, 5 Drawing Sheets

- MEASUREMENTS ARE THE n PSEUDORANGES (n>0)

$$z = \begin{bmatrix} \rho_1 \\ \rho_2 \\ \vdots \\ \rho_\eta \end{bmatrix} = h(X) + v, \quad v \sim N(0, V), \quad V = \sigma(\rho)^2 I_\eta$$

- STATES ARE: $x = [x \ y \ z \ \dot{x} \ \dot{y} \ \dot{z} \ b \ \dot{b} \ \ddot{b}]^T$ $$h = \begin{bmatrix} \sqrt{(x-x_1)^2 + (y-y_1)^2 + (z-z_1)^2} + b \\ \sqrt{(x-x_2)^2 + (y-y_2)^2 + (z-z_2)^2} + b \\ \vdots \\ \sqrt{(x-x_\eta)^2 + (y-y_\eta)^2 + (z-z_\eta)^2} + b \end{bmatrix}$$

$$H = \frac{dh}{dx} = \begin{bmatrix} \frac{x-x_1}{R_1} & \frac{y-y_1}{R_1} & \frac{z-z_1}{R_1} & 0 & 0 & 0 & 1 & 0 & 0 \\ \frac{x-x_2}{R_2} & \frac{y-y_2}{R_2} & \frac{z-z_2}{R_2} & 0 & 0 & 0 & 1 & 0 & 0 \\ \vdots & \vdots & \vdots & \vdots & \vdots & \vdots & \vdots & \vdots & \vdots \\ \frac{x-x_\eta}{R_\eta} & \frac{y-y_\eta}{R_\eta} & \frac{z-z_\eta}{R_\eta} & 0 & 0 & 0 & 1 & 0 & 0 \end{bmatrix}$$

ROBUST AUTONOMOUS GPS TIME REFERENCE FOR SPACE APPLICATION

CLAIM OF PRIORITY BASED ON CO-PENDING PROVISIONAL APPLICATION

The present application is related to co-pending Provisional patent application Ser. No. 60/080,213 of SUN HURDIAZ, JOHN J. RODDEN, and RICHARD A. FULLER, filed Mar. 31, 1998, entitled "ROBUST AUTONOMOUS GPS TIME REFERENCE FOR SPACE APPLICATION", and based on which priority is herewith claimed under 35 U.S.C. 119(e) and the disclosure of which is incorporated herein by reference in its entirety.

BACKGROUND OF THE INVENTION

1. Field of the Invention

The present invention relates to space vehicle navigation and control and more particularly to a method and apparatus for providing an accurate Global Positioning System (GPS) time reference for spacecraft such as Low Earth Orbit (LEO) satellites.

2. Prior Art

Satellites and other spacecraft require a time reference for controlling their navigation and orientation and coordinating their operations with other devices with which they interact. A common source of a time reference is the GPS which provides signals from which the local satellite clock bias can be determined to generate an accurate time reference. Typically, receivers for detecting and using GPS signals require the pick up of signals from a number of GPS satellites, for example, the Three Axis Navigation System (TANS) Vector receiver for satellites, available from TRIMBLE NAVIGATION, of Sunnyvale, Calif., requires 4 GPS satellites to be in the view of the receiver in order to provide the receiver clock bias to generate the time reference. If there are less than 4 such satellites in view, then the clock bias solution is held fixed, which results in large errors in the time reference.

3. Problem to be Solved

It is therefore a problem in the art to obtain a reliable and accurate receiver clock bias signal for generating an accurate time reference for a spacecraft or satellite.

4. Objects

It is accordingly an object of the present invention to provide a method and apparatus that will obtain a reliable and accurate receiver clock bias signal for generating an accurate time reference for a spacecraft or satellite.

It is a further object of the invention to provide a system that uses GPS signals to obtain a reliable and accurate receiver clock bias signal, which system is capable of generating an accurate time reference for a spacecraft or satellite with less than 4 GPS satellites within the view of the receiver.

SUMMARY OF THE INVENTION

The present invention is directed to obtaining a receiver clock bias signal for a spacecraft in motion to generate an accurate time reference. The invention uses a real-time navigation Kalman filter solution of the receiver clock bias to provide a GPS time reference even when there are less than 4 GPS satellites within the view of the receiver in the spacecraft. The real-time navigation Kalman filter in the spacecraft is adapted to provide an accurate solution of the clock bias even when there are outages of less than 4 GPS satellites in view by the receiver, by means of a system which uses the knowledge of the dynamic motion of the satellite in conjunction with GPS signals for a robust estimation of time. The system provides an accurate GPS time reference for a receiver in dynamic motion, even when less than 4 GPS satellites are in view, by transferring timing information from an atomic reference standard (GPS) to a spacecraft in motion by directly measuring the GPS signal and without depending upon the tracking of multiple GPS satellites or a static receiver. The invention may be implemented in current aerospace qualified GPS receivers, e.g., the "GPS TENSOR™" produced by the assignee of the present application, and known orbital dynamics are used to predict receiver position which aids in the transfer of the GPS time.

BRIEF DESCRIPTION OF THE DRAWINGS

FIG. 4 illustrates a matrix equation for one embodiment of the Measurement Model unit of the navigation Kalman filter of FIG. 1 in accordance with the present invention.

DETAILED DESCRIPTION OF THE PREFERRED EMBODIMENT

The present invention involves the use of a real-time navigation Kalman filter solution of the receiver clock bias to provide a GPS time reference for a spacecraft or satellite in motion. The real-time navigation Kalman filter in the spacecraft can be used to provide an accurate solution of the clock bias even when there are less than four GPS satellites in the view of the receiver. An example of a current advanced aerospace qualified GPS receiver in which the present invention may be implemented is the "GPS TENSOR ™" (TM of the assignee of the present application), such as disclosed in an article by present co-inventor R. A. FULLER, and others, entitled "Spacecraft Guidance and Control with GPS Tensor", presented at the 19th Annual AAS Guidance and Control Conference, Feb. 7–11, 1996, Breckenridge, Colo., which article is incorporated herein by reference. Updated information thereon is disclosed in another article by the present co-inventors, and others, entitled "GPS Tensor™ An Attitude and Orbit Determination System for Space", presented at ION GPS-97, Sep. 16–19, 1997, Kansas City, Mo., which article is also incorporated herein by reference. The GPS TENSOR™ generates navigation position/velocity data, precision timing signals, and 3 axes of spacecraft attitude, utilizing 9 channels, and is particularly suited for use with the "GLOBALSTAR" (TM of Globalstar, Inc.) communication satellite constellation presently in the process of being implemented. The operation of this receiver starts with coded RF signals from the GPS Satellite Vehicles (SVs) in a constellation flying at about 20,000 km, half synchronous altitude. The first step is to measure "pseudo-ranges" between the spacecraft or satellite carrying the receiver and the GPS SVs. The pseudorange is the time delay or "distance" between the time a signal is sent from a GPS SV and the time of its receipt by the spacecraft receiver plus the clock bias offset of the receiver clock, or in other words, the true geometrical distance between the SV and receiver at the time of signal transmission plus the effect of the receiver clock bias.

The operation of the invention requires that pseudo-range signals be available and in progress and preferably that they be received by multiple antennas, although in actuality the navigation function only requires one antenna. Thus, the invention may be implemented in any spacecraft that can usefully receive GPS signals, typically LEO spacecraft with altitudes below about 20,000 km.

Figure 1:
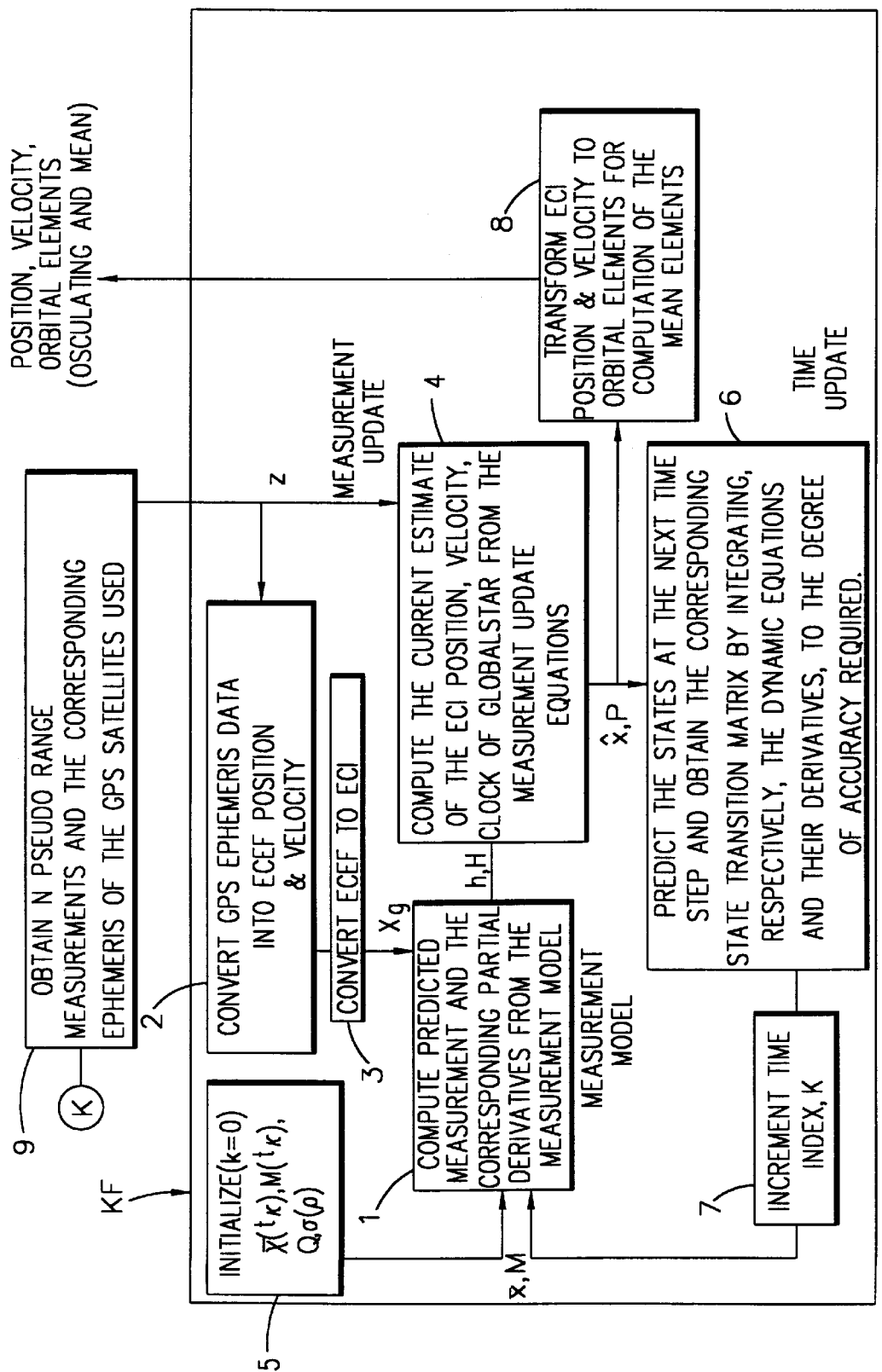
FIG. 1 is a schematic diagram of the conventional navigation Kalman filter.
Figure 5:
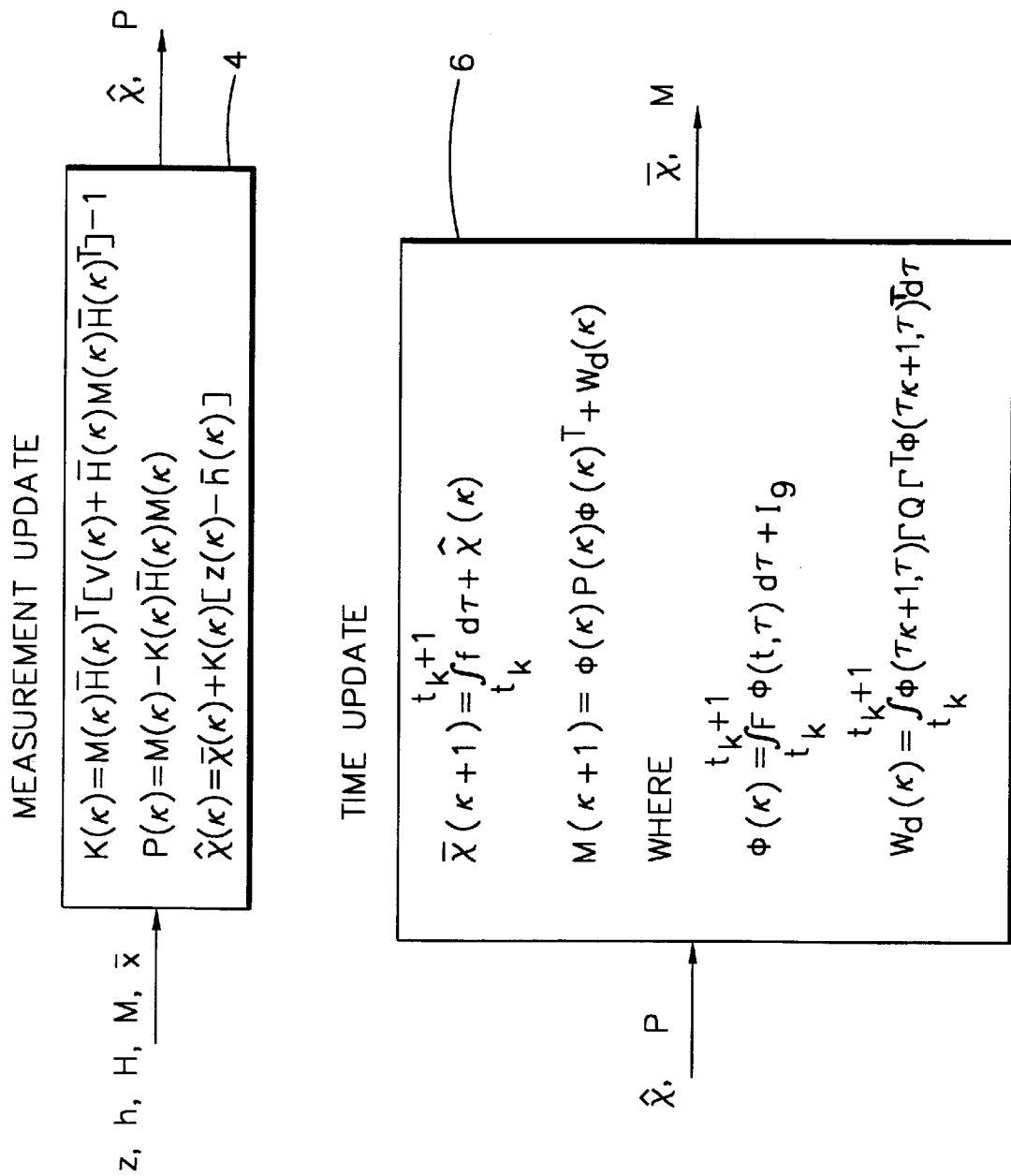
FIG. 5 illustrates matrix equations for one embodiment of the Measurement Update unit and the Time Update unit of the navigation Kalman filter of FIG. 1 in accordance with the present invention.

As seen in FIG. 1, which is a block diagram of the elements and functions of a conventional navigation Kalman filter (KF) in a satellite vehicle (SV), the beginning of the process involves initializing an index k to 0, and the parameters $\bar{\chi}(t_k)$, $M(t_k)$, Q, and $\sigma(\rho)$, in initializing unit 5 of the filter. In these expressions, $t_k$ is the time index and the other parameters are identified as follows:

$\bar{\chi}$ is the state vector made up of, in this case, 9 elements, i.e., 3 position, 3 velocity, and 3 for clock bias, bias drift (rate), and bias drift rate (acceleration), but more states could be added for further system refinement;

$\bar{\chi}(t_k)$ is the initial guess or best estimate of the states at time ($t_k$) before a measurement update is made, and is used in the Measurement Model (MM) unit 1 (as shown in FIG. 4) to predict the measurements as well as to update the state estimate $\hat{\chi}(t_k)$ in the Measurement Update unit 4 (as shown in FIG. 5);

M is the propagated state covariance matrix (i.e., after a time update), which is 9×9 in this case, constituting a matrix of the expected values of the products of any combination of 2 state values, and as time indexed, $M(t_k)$, is the covariance matrix, i.e., error matrix, corresponding to the $\bar{\chi}(t_k)$ and is used in the Measurement Update unit 4 (as shown in FIG. 5) to compute the gains K as well as to update the state covariance matrix denoted by $P(t_k)$ corresponding to $\hat{\chi}(t_k)$ after a measurement update;

Q is the spectral density matrix of the plant or process noise, here a 4×4 matrix of terms for the 3 position accelerations and the clock bias acceleration, the clock bias being like an extra position term that is determined in the navigation process, and Q characterizes how good the dynamics model is and is used in the equation for updating the covariance matrix in the time update to the next time step, denoted by M(k+1) in FIG. 5; and $\sigma(\rho)$ is the measurement noise associated with the pseudo-range measurements, $\rho$.

In operation, the resulting $\bar{\chi}$ and M signals are provided as an input to Measurement Model (MM) unit 1, along with time indexing, ($t_k$), signals from incrementing unit 7, for inclusion in a computation made in the MM unit 1 (FIG. 4). Another input signal to the MM unit 1 is produced by first obtaining n pseudo-range measurements $\rho$ and the corresponding ephemeris data of the GPS satellites used as the sources in unit 9, and providing this information to a conversion unit 2 which converts the GPS ephemeris data into Earth-Centered-Earth-Fixed (ECEF) position and velocity indicative signals.

ECEF is the reference coordinate system in which the GPS ephemeris is reported. The ECEF position and velocity indicative signals are then converted to signals $x_g$ of another reference coordinate system, i.e., Earth-Centered-Inertial (ECI) signals, in converting unit 3 and input to the MM unit 1. The MM unit 1 functions to compute (FIG. 4), using the incremented $\bar{\chi}$ signal and the ECI signals $x_g$, a predicted measurement and the corresponding partial derivatives from the measurement model, and outputs signals indicative thereof, h, H, to a Measurement Update (MU) unit 4 (FIG. 5). In addition to the h, H signal input, the MU unit 4 also receives an incremented z input of n pseudo-range measurements $\rho$ used as the sources, from unit 9, and computes a current estimate of the ECI position, velocity, and clock bias of the receiver from the measurement update equations. The MU unit 4, after each measurement, uses time indexed covariance matrix $M(t_k)$ to generate a new updated estimate $\hat{\chi}$ of position, velocity, and clock bias parameters, in this case it is 9 states, as well as a new covariance matrix P, and provides output signals indicative of $\hat{\chi}$ and P, to a Time Update (TU) unit 6 (FIG. 5) and a transform (Tr) unit 8. The TU unit 6 uses the signals, $\chi$, P, input from the MU unit 4 to predict the states at the next time step and obtain the corresponding state transition matrix by integrating, respectively, the dynamic equations and their derivatives, to the degree of accuracy required. The Tr unit 8 transforms ECI position and velocity signals, input from the MU unit 4, to orbital elements, for computation of the mean elements, and outputs signals indicative of position, velocity, and orbital elements, both osculating and mean. These output signals also include the filter clock bias solution.

Figure 2:
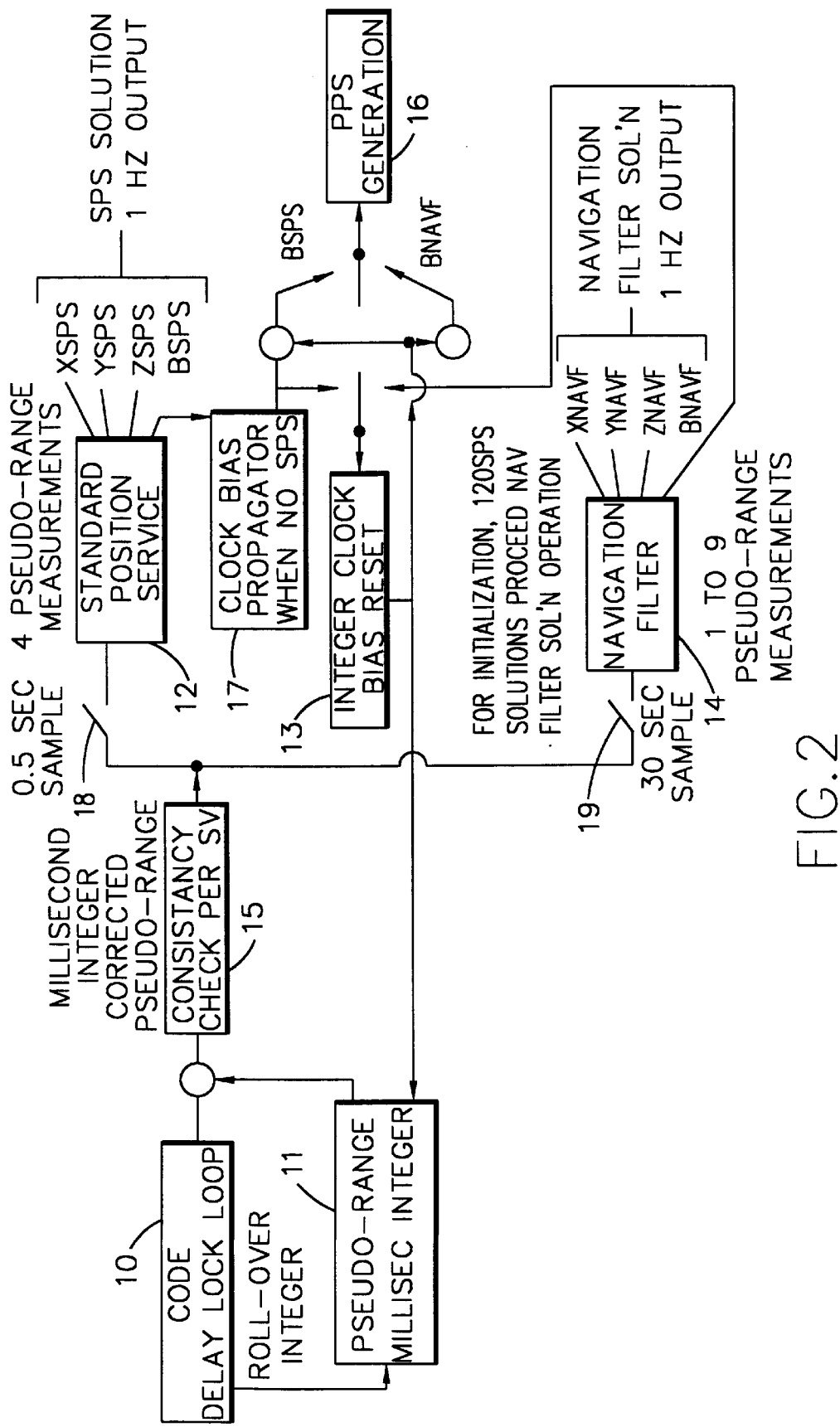
FIG. 2 is a block diagram of a system illustrating how the filter clock bias solution of the navigation Kalman filter of FIG. 1 can be used for a pulse-per-second (PPS) time reference in accordance with the invention.

FIG. 2 shows a block diagram of a system for navigation solution flow, such as may be implemented in the GPS TENSOR™, and illustrates how the filter clock bias solution can be used for the Pulse-Per-Second (PPS) time reference. The Navigation Filter (NF) unit 14 is the navigation Kalman filter (KF) described above with respect to FIG. 1, and the receiver clock bias solution of the NF unit 14 can be used for resetting the integer clock bias in Integer Clock Bias Reset unit 13 and/or for generating PPS pulses in PPS Generation unit 16.

In applying the input information in the GPS TENSOR™ it should be understood that there are two navigation solutions performed in the GPS TENSOR™, i.e., the Standard Position Service (SPS) solution and the Navigation Filter (NF) solution, as illustrated in the diagram of FIG. 2. As seen in the Figure, a Code Delay Lock Loop (DLL) unit 10 is provided to measure fractional millisecond parts of the pseudo-ranges, and the integer number of milliseconds in a pseudo-range is initially calculated upon SV signal acquisition. Both the pseudo-range and clock bias values are divided into terms comprising integer millisecond distances, e. g., 300 km, plus a fractional millisecond segment. Additional integers are rolled over, from the raw Code Phase millisecond measurement, each time the fractional millisecond exceeds an integer, and are input to a Pseudo-Range Millisecond Integer (PRMI) unit 11. PRMI unit 11 also receives an integer clock bias signal, that is similarly reset and rolled over at an Integer Clock Bias Reset (ICBR) unit 13, from the bias calculated in either the Standard Position Service (SPS) unit 12 or the Navigation Filter (NF) unit 14. This clock bias signal is used in the PRMI unit 11 to offset the pseudo-range measurement data that goes into both the SPS (12) and the NF (14) units' calculations through the Consistency Check unit 15, which passes the millisecond integer corrected pseudo-range indicative signals. The millisecond integer corrected pseudo-range signals are input to the SPS unit 12 and the NF unit 14 at different rates, timed by sample switches 18, 19. The sample time of the SPS unit 12 is 0.5 seconds, and the sample time of the NF unit 14 is selectable with a default time of 30 seconds.

The initialization of the NF unit 14 is preceded by 120 SPS solutions. The NF unit (14) computations have a bias estimate independent from the SPS solution. So if the adjustment is made using one solution, the bias of the other solution is incremented at the same time to stay consistent with the adjusted pseudo-range measurements. The GPS time reference is the standard throughout the network for communications systems such as the GLOBALSTAR satellites. The SPS unit 12 numerically solves for the 4 unknowns, i.e., the x-y-z positions and the clock bias b, using 4 pseudo-range measurements. This Service (SPS) 12 is subject to position calculation outages and without these 4 measurements no SPS solution is possible. Then a separate Clock Bias Propagator unit 17 may be utilized.

An alternate navigation solution involving the Navigation Filter (14) algorithm uses individual pseudo-range measurements to adjust a continuous running dynamic model of the 4 system position parameters, x-y-z, and clock bias b, and their derivatives. The NF unit 14 can use up to all 9 measurement channels available in the GPS TENSOR™. It also will generate an estimate of the position parameters, even in the event of short term absences of new pseudo-range inputs, based on dynamic extrapolation of the preceding operation. The NF unit (14) operation is first initialized with the SPS solution. To ensure that the SPS solution is stable, 120 such solutions are generated before initializing the NF unit 14. In one embodiment the NF unit 14 estimates 9 states, i.e., 3 position states, 3 velocity states, and receiver clock bias, bias rate, and bias acceleration. The filter typically converges within two orbital periods of the satellite containing the GPS receiver. Once the parameters are converged, the NF unit (14) solution is more accurate than the SPS unit (12) solution since it continually averages more data. The NF unit solution is also more robust since it doesn't suffer outages when there are less than 4 SVs available for processing. The interaction of these two solutions in conditioning the pseudo-range input data may be dealt with by the melding of the integer millisecond rollover from the Code Delay Lock Loop (DLL) unit 10 with the millisecond resets. The PPS output at unit 16 is more robust with the NF solution than with the SPS solution since, as noted, the latter is more susceptible to outages. For satellite systems, such as GLOBALSTAR, the precision timing signal of the PPS output is critical. There are separate output pins for these pulses which are produced at a 1 second interval accurate to a microsecond. The entire network of GLOBALSTAR communication frequencies are locked onto the "universal" GPS Time as detected and regenerated by the GPS TENSOR™. The generation of the PPS signal is based on the clock bias parameter of the navigation calculations. The GPS TENSOR™ operates such that the default selection of the NF calculated clock bias is used for PPS generation.

Figure 3:
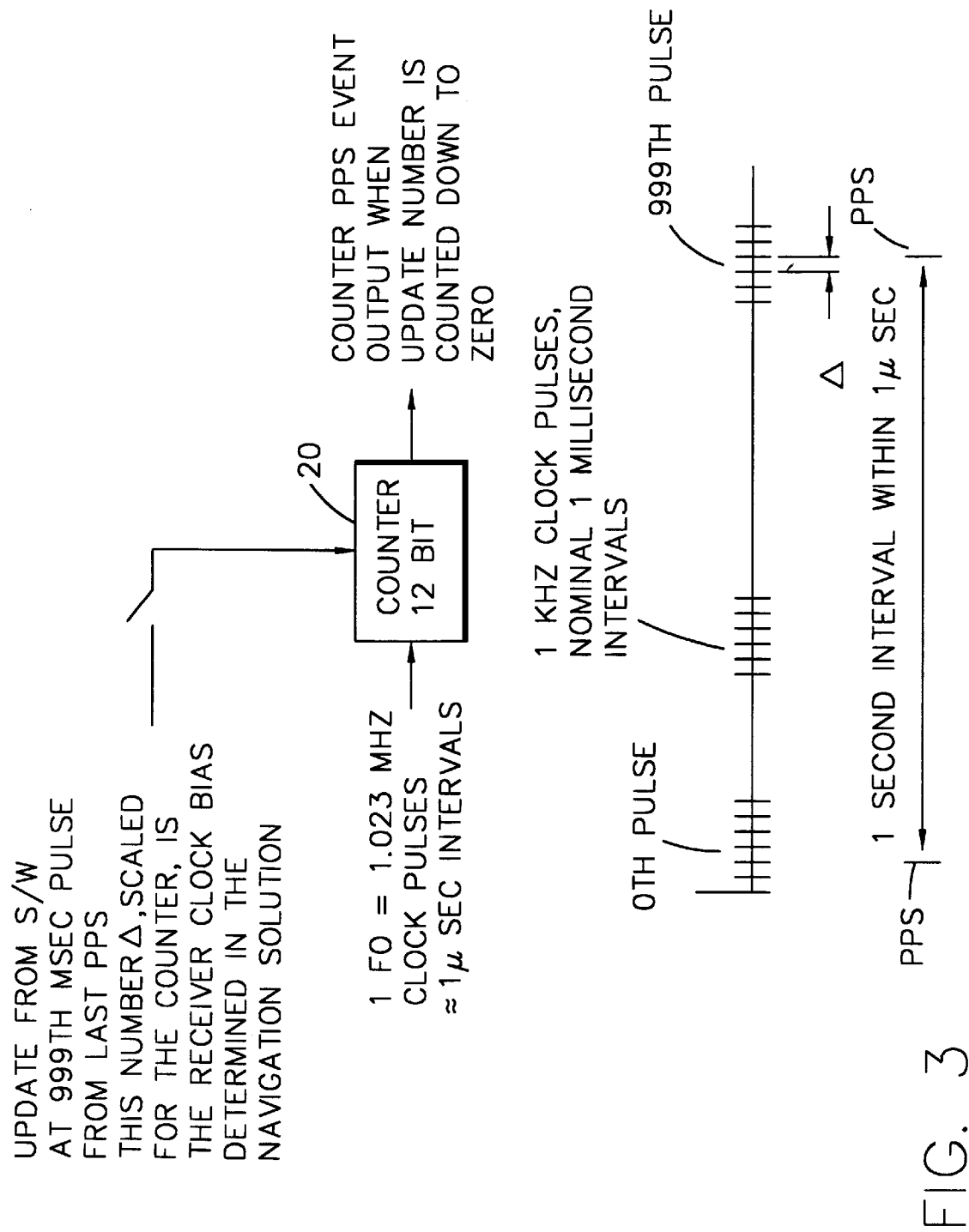
FIG. 3 illustrates how the PPS is generated from the clock bias solution obtained with the system of FIG. 2.

FIG. 3 illustrates the pulses per second (PPS) mechanization in the PPS Generation unit 16 of FIG. 2. It is the mechanism that generates a time reference based on the GPS system. One of its inputs is the receiver clock bias which in turn is produced either from the NF unit (14) solution or the SPS unit (16) solution, both of which use measurements from GPS satellites that are in the view of the receiver. A clock bias signal input, Δ, to a 12-bit counter 20 is updated from software at the $999^{th}$ msec pulse from the last PPS pulse as seen in the lower part of FIG. 2 which shows 1 kHz clock pulses, at nominal 1 millisecond intervals. This number Δ, scaled for the counter 20, is the receiver clock bias determined in the Navigation solution. Another input constitutes pulses from a 1.023 MHz clock at roughly 1 μsec intervals. The counter (20) produces a PPS event output when the update number is counted down to zero. While PPS generation works with the SPS solution, due to the significant degradation of its accuracy when less than 4 satellites are in view, the NF solution is preferable as it can be accurately maintained even during outages so that the resulting PPS also remains accurate.

FIG. 4 illustrates a matrix equation for one embodiment of the MM unit 1 of the navigation Kalman filter of FIG. 1 in accordance with the present invention, wherein the noise on the pseudorange measurements, ρ, is modeled with a zero mean normal distribution, N, and with a covariance matrix, V, which is assumed to be diagonal as indicated by the identity matrix, In, of dimension n. In such an embodiment the navigation filter may consist of 9 states that include the 3 position coordinates (x, y, z), their rates, the clock bias, b, and its rate and acceleration.

FIG. 5 illustrates matrix equations for one embodiment of the Measurement Update unit 4 and the Time Update unit 6 of the navigation Kalman filter of FIG. 1 in accordance with the present invention, wherein τ is a dummy time variable in the integrals, Φ is the state transition matrix, $W_d$ is the discreet state noise covariance matrix, F is the Jacobian of the state derivative function f, Γ is the transition matrix from the state noise to all the states, and Q is the spectral density matrix of the state noise.

Accordingly, it will be seen that a real-time navigation Kalman filter solution of the receiver clock bias can be used to provide a GPS time reference even when there are outages of less than 4 satellites in view by the receiver, and thus this approach provides a more robust source of receiver clock bias solutions. The prior art only solves for precise timing when 1) 4 satellites are in view by the receiver in dynamic motion, and 2) one satellite is in view by a static receiver. The invention uses the knowledge of the dynamic motion of the satellite in conjunction with GPS signals for robust estimation of time. It provides an accurate GPS time reference for a receiver in dynamic motion, even when less than 4 satellites are in view, by transferring timing information from an atomic reference standard (GPS) to a spacecraft by directly measuring the GPS signal and without depending upon the tracking of multiple GPS satellites or a static receiver. Known orbital dynamics are used to predict receiver position which aids in the transfer of the GPS time.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for providing an accurate Global Positioning System (GPS) time reference for a spacecraft in space, comprising:

receiver means, in said spacecraft, for receiving clock bias signals to determine a time reference;

means, in said spacecraft, for producing signals indicative of the dynamic motion of said spacecraft;

a real-time navigation Kalman filter means, in said spacecraft, for directly measuring GPS signals from GPS satellite vehicles and transferring timing information in the form of a receiver clock bias signal to said receiver means based on said GPS signals; and means, in said receiver means, for using the signals indicative of the dynamic motion of said spacecraft in conjunction with said receiver clock bias signal to produce a time reference estimation for said spacecraft.

2. Apparatus as claim 1 wherein said GPS satellite vehicles comprise less than four.

3. A method for providing an accurate Global Positioning System (GPS) time reference for a spacecraft in space, comprising the steps of:

receiving, in said spacecraft, clock bias signals to determine a time reference;

producing, in said spacecraft, signals indicative of the dynamic motion of said spacecraft;

using a real-time navigation Kalman filter, in said spacecraft, for directly measuring GPS signals from GPS satellite vehicles and producing timing information in the form of a received clock bias signal based on said GPS signals; and using, in said spacecraft, the signals indicative of the dynamic motion of said spacecraft in conjunction with said received clock bias signal to produce a time reference estimation for said spacecraft.

4. A method as claim 3 wherein said GPS satellite vehicles comprise less than four.

5. A system for providing an accurate Global Positioning System (GPS) time reference for an Earth satellite using a navigation Kalman filter, comprising:

a measurement model (MM) unit in said Kalman filter;

means for initializing a time index $t_k$ to 0, and $\chi(t_{-k})$, $M(t_k)$, Q, and $\sigma(\rho)$ and providing $\chi$, M signals as an input to said MM unit;

means for providing incrementing time index, $t_k$, signals as an input to said MM unit;

means for obtaining n pseudo-range measurements and the corresponding ephemeris data of the GPS satellites used as the sources for said measurements and emphemeris data information, and producing a signal z with this information;

means for converting the GPS ephemeris data into Earth-Centered-Earth-Fixed (ECEF) position and velocity indicative signals, where ECEF is the reference coordinate system in which the GPS ephemeris is reported;

means for converting the ECEF position and velocity indicative signals to another reference coordinate system, Earth-Centered-Inertial (ECI) signals, $x_g$, and inputting said $x_g$ signals to the MM unit;

a measurement update (MU) unit;

a time update (TU) unit;

a transform (Tr) unit;

means, using the incremented $\chi$ and M signals, said incremented time index, $t_k$, signals, and the ECI signals $x_g$, (for computing a predicted measurement and the corresponding partial derivatives from the measurement model, and outputting signals indicative thereof, h, H, to said MU unit;

means for inputting an incremented signal z to the MU unit;

means, in said MU unit, for using signals h, H, and z to compute a current estimate of the ECI position, velocity, and clock of the SV from the measurement update equations, and providing resuling output signals $\chi$, P, from the MU unit to said time update (TU) unit and said transform (Tr) unit;

means, in said TU unit, for using the signals $\chi$, P, to predict the states at the next step and to obtain the corresponding state transition matrix by integrating, respectively, the dynamic equations and their derivatives, to the degree of accuracy required;

means, in said Tr unit, for transforming the signals, $\chi$, to orbital elements, and computing the means elements, and outputting signals indicative of position, velocity, and orbital elements, both osculating and means, which output signals provide the filter clock bias solution; and means, responsive to said signals indicative of position, velocity, and orbital elements, both osculating and means, for using said filter clock bias solution to obtain an accurate Global Positioning System (GPS) time reference; wherein:

$\chi(t_k)$ is the initial guess or best estimate of the states at time $(t_k)$ before a measurement update is made;

$M(t_k)$ is the state error covariance matrix, after a time update, corresponding to $\chi(t_k)$;

Q is the spectral density matrix of the plant or process noise, which characterizes how good the dynamics model is and is used in the equation for updating the state error covariance matrix, $M(t_k)$; and $\rho(\sigma)$ is the measurement noise associated with the pseudo-range measurements, $\rho$.

6. A system as claim 5 wherein said GPS satellites comprise less than four.

7. A method for providing an accurate Global Positioning System (GPS) time reference for an Earth satellite using a navigation Kalman filter that receives GPS signals from GPS satellite sources, comprising the steps of:

initializing an index k to 0, $\chi(t_k)$, $M(t_k)$, Q, and $\sigma(\rho)$ parameters and providing $\chi$, M signals as an input to a measurement model (MM) unit in the filter containing a measurement model with partial derivative;

providing incremented time index $t_k$, signals as an input to said MM unit;

obtaining information including n pseudo-range measurements and the corresponding ephemeris data of the GPS satellites used as the sources, and producing a signal z with said information;

converting the GPS ephemeris data into Earth-Centered-Earth-Fixed (ECEF) position and velocity indicative signals, where ECEF is the reference coordinate system in which the GPS ephemeris data is reported;

converting said ECEF position and velocity indicative signals to another reference coordinate system, Earth-Centered-Inertial (ECI) signals, $x_g$, and inputting said $x_g$ signals to said MM unit;

computing, using incremented $\chi$ and M signals, said incremented time index $t_k$, signals and the ECI signals $x_g$, a predicted measurement and the corresponding partial derivatives from the measurement model, and outputting signals indicative thereof, h, H, to a measurement update (MU) unit 4 with measurement update equations;

inputting an incremented signal z to the MU unit and using signals h, H, and z to compute a current estimate of the ECI position, velocity, and clock of the SV from the measurment update equations, and providing resulting output signals $\chi$, P, from the MU unit to a time update (TU) unit and a transform (Tr) unit;

using the signals, $\chi$, P, in the TU unit to predict the states at the next time step and to obtain the corresponding state transistion matrix by integrating, respectively, the dynamic equationss and their derivatives, to the degree of accuracy required;

using the Tr unit to transform the signals, $\chi$ to orbital elements, and computing the mean elements, and outputting signals indicative of position, velocity, and orbital elements, both osculating and mean, which output signals provide the filter clock bias solution; and using said filter clock bias solution to obtain an accurate Global Positioning System (GPS) time reference;
wherein:
$\chi(t_k)$ is the initial guess or best estimate of the states at time ($t_k$) before a measurement update is made;
M($t_k$) is the state error corvariance matrix, after a time update, corresponding to $\chi(t_k)$;
Q is the spectral density matrix of the plant or process noise, which characterizes how good the dynamics model is and is used in the equation for updating the state error covariance matrix, M($t_k$);
$\rho(\sigma)$ is the measurement noise associated with the pseudo-range measurements, $\rho$.

8. A method as claim 7 wherein said GPS satellites comprise less than four.

* * * * *

UNITED STATES PATENT AND TRADEMARK OFFICE
CERTIFICATE OF CORRECTION

PATENT NO.     : 6,266,584 B1
DATED          : July 24, 2001
INVENTOR(S)    : Hur-Diaz et al.

It is certified that error appears in the above-identified patent and that said Letters Patent is hereby corrected as shown below:

Column 7,
Line 31, "emphemeris" should read -- ephemeris --.

Column 8,
Line 59, "equationss" should read -- equations --.

Signed and Sealed this

Eighth Day of April, 2003

JAMES E. ROGAN
*Director of the United States Patent and Trademark Office*